United States Patent [19]

Nance-Kivell

[11] 4,338,601
[45] Jul. 6, 1982

[54] APPARATUS FOR THE STORAGE AND TRANSFER OF INFORMATION

[76] Inventor: Stanley Nance-Kivell, 40 Stafford Rd., Cowies Hill, Durban, Natal, South Africa

[21] Appl. No.: 160,341

[22] Filed: Jun. 18, 1980

[30] Foreign Application Priority Data

Jun. 28, 1979 [ZA] South Africa ................ 79/3236

[51] Int. Cl.³ ............................................. G08C 19/28
[52] U.S. Cl. ........................ 340/870.02; 340/870.03; 340/825.31; 340/825.34; 340/825.35
[58] Field of Search ................... 340/150, 151, 152 T, 340/870.02, 149 R, 825.31, 825.34, 825.35

[56] References Cited

U.S. PATENT DOCUMENTS

| | | | |
|---|---|---|---|
| 3,840,866 | 10/1974 | St. Clair | 340/870.02 |
| 4,119,948 | 10/1978 | Ward | 340/870.02 |
| 4,132,981 | 1/1979 | White | 340/151 |

FOREIGN PATENT DOCUMENTS

| | | | |
|---|---|---|---|
| 1140187 | 1/1969 | United Kingdom | 340/543 UX |
| 1257549 | 12/1971 | United Kingdom | 340/543 UX |

*Primary Examiner*—Harold I. Pitts
*Attorney, Agent, or Firm*—Ladas & Parry

[57] ABSTRACT

A monitoring apparatus which has a plurality of encoders for installation at respective outlying stations, a decoder for installation at a central station and a portable memory module to be carried by a person whose visits to the outlying stations are to be monitored. Each encoder includes a particular configuration of permanent magnets which provides it with its own predetermined magnetic code for identifying the station at which it is installed. This code, in the case of each encoder, is read out and converted to a corresponding binary electric pulse code with the aid of reed switches in the portable memory module, the switches being operated by the fields of respective ones of the encoder magnets when the module is interfaced with the encoder, the electric pulses being inputted to a shift register which is also in the module and which electronically stores the pulse code. After the last of the outlying stations has been visited and the pulse codes thereof have been serially stored in the shift register, the codes are transferred by electromagnetic induction to a binary-to-decimal converter in the decoder upon interfacing the memory module with the decoder, the transfer being initiated by the operation of an additional reed switch in the module by a permanent magnet in the decoder. A visual display device, also in the decoder, is actuated by the output of the converter to indicate whether or not the visits being monitored were in fact made.

10 Claims, 3 Drawing Figures

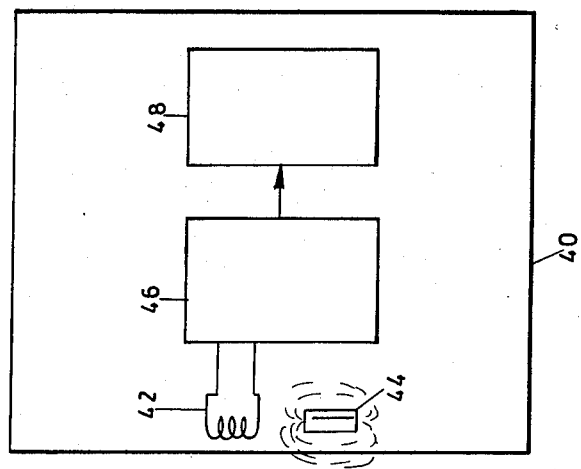
FIG_3
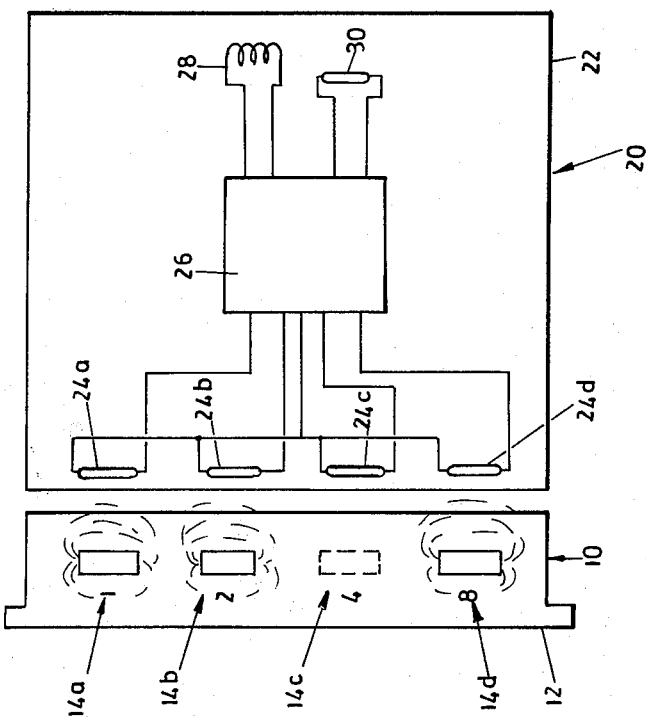
FIG_2
FIG_1

APPARATUS FOR THE STORAGE AND TRANSFER OF INFORMATION

BACKGROUND OF THE INVENTION

This invention relates to apparatus for transferring information between two or more points, for the purpose of insuring or confirming that certain actions have been carried out.

SUMMARY OF THE INVENTION

The invention provides apparatus for transferring information which comprises at least one encoder which in use contains input information, portable memory means which is interfaceable with each encoder and which receives the information held in the encoder, and at least one decoder which is interfaceable with the memory means and which receives the information held in the memory means.

Each decoder may include means visually to display the information. Alternatively the decoder may include means for storing the information.

The decoder may include one or more outputs for controlling equipment or alarms associated with the decoder.

The decoder may also contain input information which can be transferred to the memory means when the decoder is interfaced therewith.

Each encoder may in its simplest form include one or more magnets arranged in a predetermined configuration, and the memory means may include magnetically operated switches which are brought into register with the magnets when the memory means is interfaced with the encoder.

The memory means may include a solid state memory for holding the information transferred to it.

The transfer of information between the memory means and the decoder may be effected by means of electromagnetic induction means.

The memory means may include its own power source of alternatively it may derive power from either the encoder or the decoder when interfaced with it.

BRIEF DESCRIPTION OF THE DRAWINGS

The invention is further described by way of example with reference to the accompanying drawings in which:

FIG. 1 schematically illustrates an encoder used in the apparatus of the invention, FIG. 2 schematically illustrates a memory module used in the invention, and FIG. 3 schematically illustrates a decoder for use with the memory module.

DESCRIPTION OF A PREFERRED EMBODIMENT

FIG. 1 illustrates an encoder 10 which consists of a housing 12 which has four predetermined locations 14(a), (b), (c) and (d), each of which in use may contain a permanent magnet. As shown in FIG. 1 the locations 14 (a), (b), and (d) contain magnets while the location (c) has no magnet. In binary coded decimal notation the locations (a), (b), (c) and (d) are assigned the values 1, 2, 4 and 8 respectively and thus the particular magnet configuration illustrated represents the number 11.

FIG. 2 illustrates a memory module 20 which consists of a housing 22 within which are mounted four reed switches 24 (a) to (d) respectively, a solid state memory 26, an induction coil 28 and a reed switch 30.

The decoder of FIG. 3 includes a housing 40, an induction coil 42, a permanent magnet 44, a digital decoder 46 and a visual display 48.

The apparatus of the invention may be used in a variety of configurations or applications. The following description is made with reference to a security system but it must be understood that the principles of the invention are equally applicable to similar situations in other fields which involve the transfer of data between two or more points.

A primary use of the system of the invention is for the recording of the movements of a patrolman or watchman. For example at a factory or any other guarded premises a number of encoders 10 are installed at strategic points along the patrolman's route. Each encoder has a particular configuration of permanent magnets 14 which identifies its location.

The patrolman is given a memory module 20 which may, for effectiveness, have a housing 22 in the shape of a police nightstick or flashlight.

The patrolman while doing his rounds and coming across each encoder brings the housing 22 into contact with the encoder 10. The alignment of the memory module and the encoder must be such that the magnets 14 are brought into register with the reed switches 24 and this may be achieved for example by forming the encoder 10 with a recess into which the memory module is inserted.

Once the encoder 10 and the memory module 20 are correctly interfaced the magnetic fields of the magnets 14 act on the reed switches 24 and data is transferred from the encoder to the reed switches. The reed switches which are actuated therefore represent, in binary form, the number associated with the encoder.

The information held in the reed switches is serially shifted into a shift register of the memory 26 and the number is electronically stored in this memory.

When the memory module 20 is interfaced with a succeeding encoder this encoder's data is also transferred via the reed switches into the electronic memory. The information from several encoders can be stored in the module shift register in this way.

Since the data is held serially in the module 20 the route followed by the night watchman can be determined. The information held in the memory may be visually displayed by interfacing the memory with a decoder of the type shown in FIG. 3. The memory module is brought into contact in such a way that the two coils 28 and 42 oppose one another and the reed switch 30 is subjected to the influence of the magnetic field of the magnet 44. When the reed switch 30 is actuated the data held in the memory 26 is fed through the coil 28 which therefore is energized by each bit of information. The changing magnetic field of the coil 28 induces a train of voltage pulses in the coil 42 and these pulses are applied to the digital decoder 46 which converts the binary information into decimal information. Decimal numbers produced by the decoder 46 are displayed in the device 48.

The display 48 could for example simply consist of a number of lamps in which instance the conversion of binary information to decimal information may be dispensed with. The display may also consist of a printer which produces a hard copy record of the movements of the patrolman.

In a different application the information carried by the module could be used to program controllers at various locations of say an oil refinery. In this instance a worker would interface the memory module with the various decoders stationed around the plant and these decoders could, depending on the information transferred to them, control the operation of associated equipment. The decoders could also be used to transfer information to the memory module so that the worker by moving the memory module between successive decoders would ensure that particular instructions are carried out in a programmed manner.

The memory module 20 may be self powered by means of storage batteries. Alternatively the memory may derive its power from the encoder or the decoder when interfaced with either of these units. Under these circumstances the information held by the memory 26 would fade, unless refreshed, within a certain period. This feature may be advantageous for various security reasons.

I claim:

1. Apparatus for monitoring the visits of a person to a plurality of outlying stations, the apparatus including respective encoders for installation at said outlying stations, portable memory means to be carried by said person, and at least one discrete decoder for installation at a central station, said encoders each being provided with at least one permanent magnet arranged in one of a plurality of predetermined fixed patterns to provide each encoder with a predetermined fixed magnetic code unique to that encoder, said portable memory means being interfaceable with each encoder and including magnetically sensitive means for reading the code of each encoder when interfaced therewith and being adapted to store the codes read from successive encoders, said portable memory means being interfaceable with said decoder for transferring thereto the codes stored in the memory means so that it can be ascertained from the transferred codes which, if any, of said outlying stations were visited by said person.

2. Apparatus according to claim 1, wherein said magnetically sensitive means comprises magnetically operable switches which, when said portable memory means is interfaced with any one of said encoders, register with respective permanent magnets of the encoder.

3. Apparatus according to claim 2, wherein said portable memory means includes a solid state shift register for serially storing said codes read from successive ones of said encoders in the form of respective pulse trains generated by the operation of said switches.

4. Apparatus according to claim 3, wherein said decoder and portable memory means include enabling means for controlling said shift register to transfer said respective pulse trains serially into the decoder when said portable memory means is interfaced with the decoder.

5. Apparatus according to claim 4, wherein said shift register and said decoder are provided with an output coil and an input coil, respectively, for the transfer of said respective pulse trains by electromagnetic induction.

6. Apparatus according to claim 5, wherein said decoder is connected at its output to means for visually displaying information represented by said respective pulse trains transferred to the decoder.

7. Apparatus according to claim 1, wherein said portable memory means includes its own power source.

8. Apparatus according to claim 1, wherein said portable memory means is arranged to derive power from one of said encoder and decoder when interfaced therewith.

9. Apparatus according to claim 8, wherein said enabling means comprises a permanent magnet located in the decoder and a magnetically operable switch located in the portable memory means, said magnet and switch being brought into registry with one another when the portable memory means is interfaced with the decoder.

10. Apparatus according to claim 6, wherein said decoder is a digital decoder for converting digital information represented by said respective pulse trains to decimal information.

* * * * *